United States Patent
Boyle

(10) Patent No.: US 11,879,219 B2
(45) Date of Patent: Jan. 23, 2024

(54) DRIVERLESS IMPACT ATTENUATING TRAFFIC MANAGEMENT VEHICLE

(71) Applicant: Norman Boyle, Candelo (AU)

(72) Inventor: Norman Boyle, Candelo (AU)

( * ) Notice: Subject to any disclaimer, the term of this patent is extended or adjusted under 35 U.S.C. 154(b) by 398 days.

(21) Appl. No.: 17/309,739

(22) PCT Filed: Dec. 10, 2019

(86) PCT No.: PCT/AU2019/051351
§ 371 (c)(1),
(2) Date: Jun. 16, 2021

(87) PCT Pub. No.: WO2020/150767
PCT Pub. Date: Jul. 30, 2020

(65) Prior Publication Data
US 2021/0381179 A1    Dec. 9, 2021

(30) Foreign Application Priority Data
Jan. 25, 2019  (AU) .............................. 2019900231

(51) Int. Cl.
*B60W 60/00* (2020.01)
*E01F 15/14* (2006.01)
(Continued)

(52) U.S. Cl.
CPC .......... *E01F 15/148* (2013.01); *B60Q 1/5035* (2022.05); *B60R 19/00* (2013.01);
(Continued)

(58) Field of Classification Search
CPC ... E01F 15/148; E01F 9/662; B60W 60/0025; B60W 10/04; B60W 10/20; B60W 10/30;
(Continued)

(56) References Cited

U.S. PATENT DOCUMENTS

| 4,860,209 A | 8/1989 | Sugimoto et al. |
| 5,172,767 A | 12/1992 | Turner et al. |

(Continued)

FOREIGN PATENT DOCUMENTS

| CH | 686048 | 12/1995 |
| DE | 2627340 A1 | 12/1977 |

(Continued)

OTHER PUBLICATIONS

Ferreira et al., Autonomous System for Wildfire and Forest Fire Early Detection and Control (Year: 2020).

(Continued)

*Primary Examiner* — Hussein Elchanti
(74) *Attorney, Agent, or Firm* — INNOVATION CAPITAL LAW GROUP, LLP; Vic Lin

(57) ABSTRACT

A driverless traffic management vehicle has a control system having a controller interfacing steering and drive interfaces for control of respective steering and drive subsystems of the vehicle. The vehicle also has an impact attenuator and actuator therefor for configuring the attenuator in deployed and stowed configurations. The control system comprises at least one driverless mode controller operably controlling the steering and drive interfaces for controlling the vehicle in at least one of follow mode, remote-control and autonomous driverless mode of operation. To control traffic, the vehicle may be driven to a roadside location and set in the at least one driverless mode of operation to control the steering and drive interfaces accordingly.

23 Claims, 3 Drawing Sheets

(51) Int. Cl.
*E01F 9/662* (2016.01)
*B60R 19/00* (2006.01)
*B60W 10/04* (2006.01)
*B60W 10/20* (2006.01)
*B60W 10/30* (2006.01)
*G01C 21/34* (2006.01)
*G08G 1/0955* (2006.01)
*G08G 1/16* (2006.01)
*B60Q 1/50* (2006.01)

(52) U.S. Cl.
CPC ............ *B60W 10/04* (2013.01); *B60W 10/20* (2013.01); *B60W 10/30* (2013.01); *B60W 60/0025* (2020.02); *E01F 9/662* (2016.02); *G01C 21/343* (2013.01); *G08G 1/0955* (2013.01); *G08G 1/166* (2013.01); *B60R 2019/005* (2013.01); *B60W 2520/10* (2013.01); *B60W 2520/12* (2013.01)

(58) Field of Classification Search
CPC .......... B60W 2520/10; B60W 2520/12; B60Q 1/5035; B60R 19/00; B60R 2019/005; G01C 21/343; G08G 1/0955; G08G 1/166
See application file for complete search history.

(56) References Cited

U.S. PATENT DOCUMENTS

| | | | |
|---|---|---|---|
| 6,038,502 A | 3/2000 | Sudo | |
| 6,195,610 B1 | 2/2001 | Kaneko | |
| 6,269,763 B1 | 8/2001 | Woodland | |
| 6,364,026 B1 | 4/2002 | Doshay | |
| 6,445,984 B1 | 9/2002 | Kellogg | |
| 7,007,420 B2 | 3/2006 | Garcia | |
| 7,522,979 B2 | 4/2009 | Pillar | |
| 8,139,109 B2 | 3/2012 | Schmiedel et al. | |
| 8,417,860 B2* | 4/2013 | Choi | H04L 67/12 710/100 |
| 8,899,903 B1 | 12/2014 | Saad et al. | |
| 9,117,185 B2 | 8/2015 | Vian et al. | |
| 9,200,904 B2 | 12/2015 | Borland et al. | |
| 9,399,150 B1 | 7/2016 | Almutairi | |
| 9,607,510 B1 | 3/2017 | DeLorean | |
| 9,725,083 B2* | 8/2017 | Dextreit | B60W 20/00 |
| 9,972,205 B2 | 5/2018 | Beaulieu | |
| 10,353,387 B2* | 7/2019 | Stenneth | G05D 1/0027 |
| 2002/0133285 A1* | 9/2002 | Hirasago | B60K 35/00 701/96 |
| 2006/0221328 A1 | 10/2006 | Rouly | |
| 2006/0229804 A1 | 10/2006 | Schmidt et al. | |
| 2007/0030212 A1* | 2/2007 | Shibata | G06T 5/50 345/9 |
| 2007/0115138 A1* | 5/2007 | Arakawa | B60R 1/00 348/148 |
| 2008/0167774 A1* | 7/2008 | Patel | G08G 1/20 701/1 |
| 2009/0205845 A1 | 8/2009 | Hoffman | |
| 2009/0255887 A1 | 10/2009 | Mrowiec | |
| 2009/0321094 A1 | 12/2009 | Thomas | |
| 2010/0032176 A1 | 2/2010 | McIntosh et al. | |
| 2010/0101401 A1 | 4/2010 | Toeckes et al. | |
| 2010/0114541 A1* | 5/2010 | Johnson | G06N 3/006 703/2 |
| 2011/0186657 A1 | 8/2011 | Haviland | |
| 2012/0021660 A1 | 1/2012 | St-Pierre et al. | |
| 2012/0064480 A1 | 3/2012 | Hegemann | |
| 2012/0226394 A1 | 9/2012 | Marcus | |
| 2012/0261144 A1 | 10/2012 | Vian et al. | |
| 2012/0303458 A1 | 11/2012 | Schuler, Jr. | |
| 2013/0080041 A1* | 3/2013 | Kumabe | G08G 1/22 701/117 |
| 2013/0114632 A1 | 5/2013 | Telford | |
| 2013/0235169 A1* | 9/2013 | Kato | G02B 30/34 348/53 |
| 2013/0270394 A1 | 10/2013 | Downs | |
| 2014/0007756 A1 | 1/2014 | Diaz | |
| 2014/0070963 A1 | 3/2014 | DeLorean | |
| 2014/0118553 A1 | 5/2014 | Diba | |
| 2014/0236414 A1* | 8/2014 | Droz | G08G 1/015 701/1 |
| 2014/0277899 A1 | 9/2014 | Matsuzaki et al. | |
| 2014/0343891 A1 | 11/2014 | Becker et al. | |
| 2015/0043231 A1 | 2/2015 | Clark | |
| 2015/0142287 A1 | 5/2015 | Dornieden et al. | |
| 2015/0202770 A1 | 7/2015 | Patron et al. | |
| 2015/0291160 A1* | 10/2015 | Kim | B60W 30/16 345/633 |
| 2015/0367861 A1 | 12/2015 | Mori et al. | |
| 2016/0014982 A1 | 1/2016 | Malsam | |
| 2016/0018822 A1 | 1/2016 | Nevdahs et al. | |
| 2016/0071418 A1 | 3/2016 | Oshida et al. | |
| 2016/0082298 A1 | 3/2016 | Dagenhart | |
| 2016/0129999 A1 | 5/2016 | Mays | |
| 2016/0170487 A1* | 6/2016 | Saisho | B60K 35/00 345/156 |
| 2016/0174453 A1 | 6/2016 | Matsuzaki et al. | |
| 2016/0240085 A1* | 8/2016 | Otsuka | G06V 20/58 |
| 2016/0274591 A1 | 9/2016 | Bick et al. | |
| 2016/0355258 A1 | 12/2016 | Williams et al. | |
| 2017/0036601 A1* | 2/2017 | Kimura | B60R 1/00 |
| 2017/0084160 A1 | 3/2017 | Piccolo | |
| 2017/0123671 A1 | 5/2017 | Kundu et al. | |
| 2017/0128759 A1 | 5/2017 | Zonio et al. | |
| 2017/0160748 A1 | 6/2017 | Nakagawaa et al. | |
| 2017/0177003 A1 | 6/2017 | Yokoyama et al. | |
| 2017/0240276 A1 | 8/2017 | Zilberstein | |
| 2017/0305365 A1* | 10/2017 | Matsumoto | B60K 37/06 |
| 2018/0120861 A1* | 5/2018 | Saxena | G05D 1/0291 |
| 2018/0247137 A1 | 8/2018 | Boyle | |
| 2018/0261088 A1 | 9/2018 | Roy et al. | |
| 2018/0326901 A1 | 11/2018 | Boyle | |
| 2018/0326995 A1 | 11/2018 | Hiramatsu et al. | |
| 2019/0044728 A1* | 2/2019 | Karmoose | H04L 9/3242 |
| 2019/0176987 A1 | 6/2019 | Beecham | |
| 2019/0294165 A1 | 9/2019 | Hofmann et al. | |
| 2019/0349719 A1* | 11/2019 | Pattan | H04W 4/08 |
| 2019/0378418 A1* | 12/2019 | Menadue | H04W 4/46 |
| 2020/0186290 A1* | 6/2020 | Zhang | H04L 1/0073 |
| 2020/0249699 A1* | 8/2020 | Kim | G08G 1/22 |
| 2021/0264793 A1* | 8/2021 | Shuman | H04W 52/10 |
| 2021/0350707 A1* | 11/2021 | Ucar | H04W 4/08 |
| 2021/0381179 A1* | 12/2021 | Boyle | G01C 21/343 |
| 2022/0061068 A1* | 2/2022 | Liu | H04W 12/76 |
| 2022/0104200 A1* | 3/2022 | Zang | H04W 72/02 |

FOREIGN PATENT DOCUMENTS

| | | |
|---|---|---|
| DE | 3709662 A1 | 10/1988 |
| DE | 19722292 A1 | 12/1998 |
| DE | 102013104990 A1 | 11/2014 |
| EP | 3340000 A1 | 6/2018 |
| KR | 20150129247 A | 11/2015 |
| WO | 2008097173 A1 | 8/2008 |
| WO | 2015089588 A1 | 6/2015 |

OTHER PUBLICATIONS

Mateen et al., Smart Roads for Autonomous Accident Detection and Warnings (Year: 2022).
Sathiabalan et al., Autonomous robotic fire detection and extinguishing system (Year: 2021).
Chien et al., Develop a Multiple Interface Based Fire Fighting Robot (Year: 2007).
Colas and US Partners Global Launch of First Autonomous Road Safety Vehicle, "https://www.youtube.com/watch?v=XRWaeaZ6eTQ"—published on Aug. 17, 2017, whole video.
Eric Holst, The Devastation of the Soda Fire and the Seeds of Hope for the Future (Year: 2015).
International Search Report & Written Opinion dated Feb. 13, 2017 from PCT Application No. PCT/AU2016/051084.

(56) References Cited

OTHER PUBLICATIONS

International Search Report & Written Opinion dated Mar. 2, 2020 from PCT Application No. PCT/AU2019/051351.
Jared Harwayne-Gidansky, A Low-Complexity Navigation Algorithm for a Scalable Autonomous Firefighting Vehicle (Year: 2007).
Jijesh et al., Design and Implementation of Automated Fire Fighting and Rescuing Robot (Year: 2020).
Phan et al., A cooperative UAV-UGV platform for wildfire detection and fighting (Year: 2008).
Raj et al., Internet of Robotic Things Based Autonomous Fire Fighting Mobile Robot (Year: 2018).
Sherstijuk et al., Forest Fire Fighting Using Heterogeneous Ensemble of Unmanned Aerial Vehicles (Year: 2019).
Zhang et al., Research of AI Fire Fighting Robot Based on Big Data and Group Intelligence Perception (Year: 2020).

* cited by examiner

DRIVERLESS IMPACT ATTENUATING TRAFFIC MANAGEMENT VEHICLE

FIELD OF THE INVENTION

This invention relates generally to roadside traffic management vehicles and, more particularly, this invention relates to an impact attenuating driverless traffic management vehicle configurable in at least one driverless mode of operation.

SUMMARY OF THE DISCLOSURE

According to one aspect, there is provide a driverless traffic management vehicle comprising a control system having a controller interfacing steering and drive interfaces for control of respective steering and drive subsystems of the vehicle, an impact attenuator and attenuator actuator therefor for configuring the attenuator in deployed and stowed configurations and wherein the control system comprises at least one driverless mode controller operably controlling the steering and drive interfaces for controlling the vehicle in at least one driverless mode of operation, the control system comprises a mode control interface configured for setting the at least one driverless mode of operation and the at least one driverless mode controller comprises: a follow mode controller configured for controlling the vehicle in a driverless follow mode of operation and wherein the vehicle comprises a data interface and wherein, in use, the data interface is configured for receiving waypoint data from a lead vehicle and wherein the follow mode controller is configured for controlling the steering and drive interfaces to control the vehicle to follow the lead vehicle using the waypoint data; a remote-control mode controller configured for controlling the vehicle in a driverless remote-control mode of operation wherein the remote-control mode controller receives control instructions from a remote-control unit, the remote-controller comprising controls for controlling at least one of the steering and drive of the vehicle, and controlling at least one of the steering and drive interfaces accordingly; and driverless autonomous control mode controller configured for controlling the vehicle in a driverless autonomous control mode of operation wherein, in use, the driverless autonomous control mode controller is configured for controlling the steering and drive interfaces such that the vehicle follows a predefined waypoint route defined by a route waypoint data file.

In the driverless follow mode of operation, the controller may be configured for displaying driving indication signs comprising turn direction and stopping indication signs and the controller may be configured for receiving driving indication data signals from the lead vehicle and displaying the driving indication signs according to the driving indication data signals.

In the driverless follow mode of operation, the control system may be configured for detecting respective positions of the driverless traffic management vehicle and the lead vehicle and determining a distance along a route therebetween and displaying the distance using the electronic signage board.

The remote-control unit may comprise a signage control configured for selecting one of the plurality of signs remotely for display on the electronic signage board.

The attenuator may be pivotally coupled to a rear of the vehicle so as to pivot upwardly to the stowed configuration and pivot downwardly to the deployed configuration and wherein, in the stowed configuration, the electronic signage board may be revealed behind the attenuator.

The attenuator may comprise a rear surface and the traffic management vehicle may further comprise an attenuator electronic signage board on the rear surface and, wherein in the stowed configuration, the controller may be configured for displaying a plurality of signs on the attenuator electronic signage board and in the deployed configuration, the controller may be configured for displaying a plurality of signs on the electronic signage board.

The traffic management vehicle may further comprise a hoist having signage thereon which can be raised when the attenuator may be in the stowed configuration such that the signage thereon may be viewable above the attenuator.

The driverless traffic management vehicle may further comprise a further electronic signage board across a rearward impact face of the attenuator and the controller may be configured for displaying signs thereon when the attenuator may be in the deployed configuration.

The remote-controller may comprise a control for stowing or deploying the attenuator and the controller may be configured for controlling the attenuator actuator according to control signals received from the remote-controller.

The remote-control unit may comprise a mode control configured for setting the at least one driverless mode of operation remotely.

The predefined waypoint route may comprise waypoint regions where the attenuator may be to be deployed and waypoint regions where the attenuator may be to be stowed and wherein, when in the driverless autonomous control mode of operation, the controller may be configured for controlling the attenuator actuator to deploy or stow the attenuator accordingly.

In the at least one driverless mode of operation, the controller may be configured for sensing the speed of the traffic management vehicle and automatically deploying the impact attenuator when the speed may be less than a set speed deployment threshold.

In the at least one driverless mode of operation, the controller may be configured for sensing a verge offset of the traffic management vehicle with respect to a road verge and automatically deploying the impact attenuator according to the verge offset.

The driverless traffic management vehicle may comprise at least one proximity sensor and, in the at least one driverless mode of operation, the controller may be configured for detecting an obstacle using the proximity sensor and controlling at least one of the steering and drive interfaces to avoid a collision therewith.

The mode control interface may allow setting of a following distance and, in the driverless follow mode of operation, the follow mode controller may be configured for following the lead vehicle at the following distance.

The mode control interface may allow for configuration of a lateral steering offset and wherein the, in the driverless autonomous control mode of operation, the follow mode controller may be configured to adjust a lateral position of the vehicle according to the lateral steering offset.

The vehicle may comprise an electric drivetrain.

According to another aspect, there is provided a method comprising driving the vehicle to a roadside location and then setting the vehicle in a driverless mode of operation and leaving the vehicle to drive autonomously.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 1:
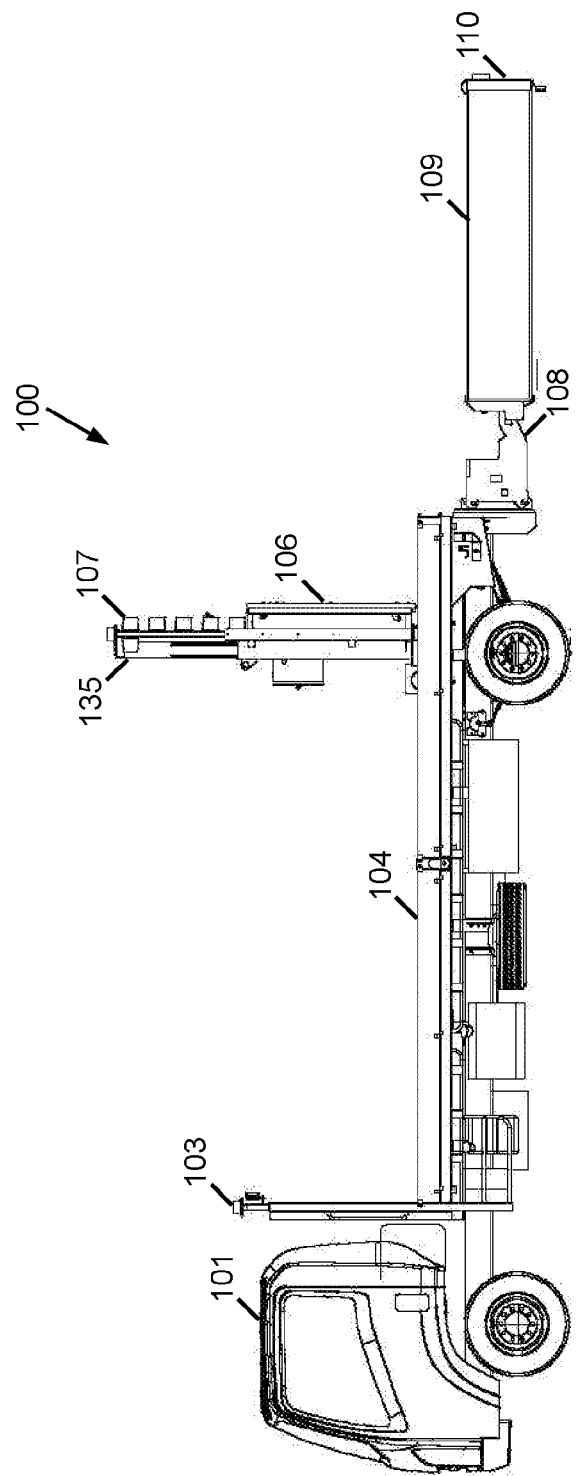
FIG. 1 shows a side elevation view of a driverless traffic management vehicle comprising an attenuator in a deployed configuration.
Figure 2:
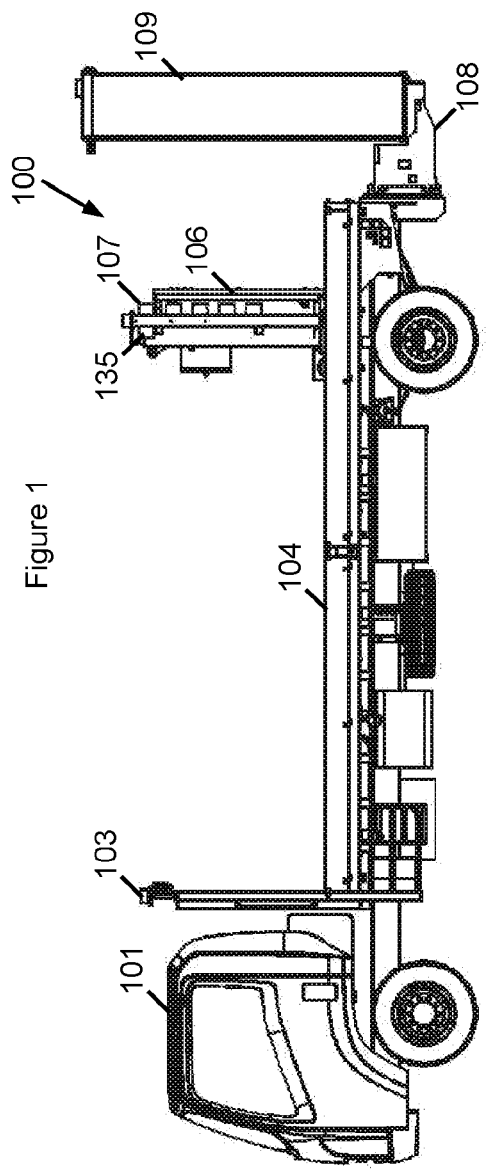
FIG. 2 shows the vehicle with the attenuator in a stowed configuration.
Figure 3:
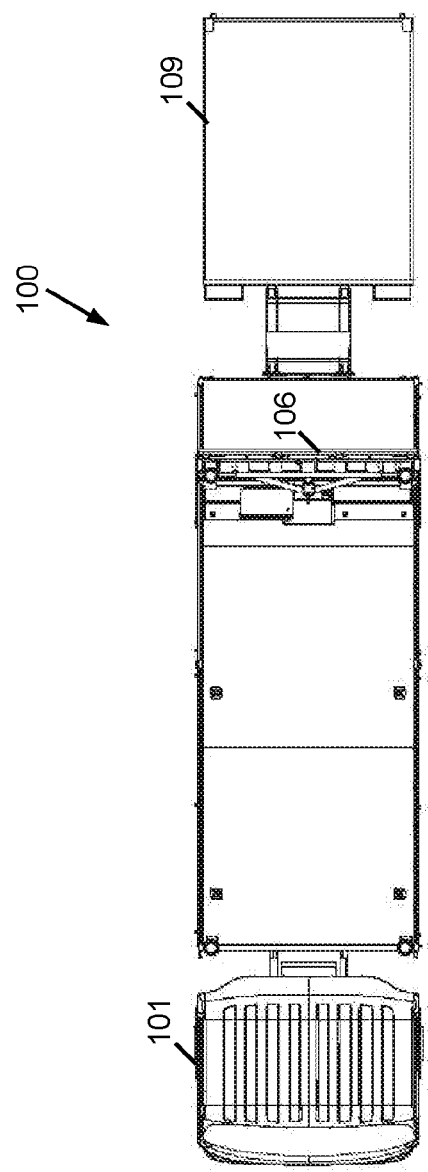
FIG. 3 shows a top plan view of the vehicle.
Figure 4:
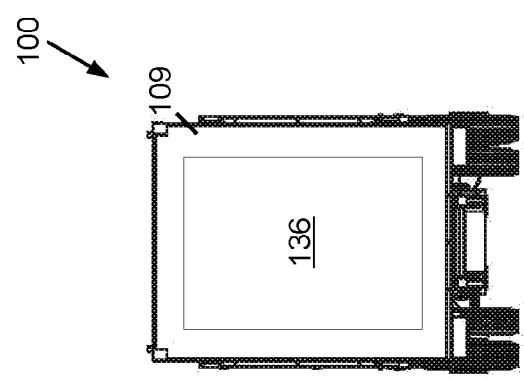
FIG. 4 shows a rear elevation view of the vehicle with the attenuator in the stowed configuration.

FIGS. 1 and 2 show side elevation views of a traffic management vehicle 100 in accordance with an embodiment. The traffic management vehicle 100 may comprise a driver cabin 101 and flatbed 104.

The vehicle 100 comprises a deployable crash attenuator 109 shown in FIG. 1 as being deployed downwardly on a pivot mechanism 108 so as to expose a rearward impact face 110 and signage. FIG. 2 shows the vehicle 100 wherein the attenuator 109 is stowed by being pivoted upwardly on the pivot mechanism 108. In this configuration, the rearward face thereof may also display signage.

The vehicle 100 may further comprise and electronic signage board 106 for the display of a plurality of signs thereon. In embodiments, the electronic signage board 106 may comprise a high intensity multicoloured dot-matrix display. As can be seen from FIG. 1, when the attenuator 109 is in the deployed configuration, the electronic signage board 106 is visible thereabove.

In embodiment, the vehicle 100 may comprise an attenuator electronic signage board 136 on a rear face of the attenuator 109 which is visible when the attenuator 109 is in the stowed configuration. In accordance with this embodiment, the attenuator electronic signage board 136 may be controlled to display signs when the attenuator 109 is in the stowed configuration shown in FIG. 1, but, when the attenuator 109 is in the deployed configuration shown in FIG. 1, the electronic signage board 106 may be used to display signs thereon. In embodiments, the vehicle 100 may further comprise a further electronic signage board across the rearward impact face 110 of the attenuator 109 which is controlled to display signs thereon when the attenuator 109 is in the deployed configuration.

The vehicle 100 may further comprise further signage 107. The further signs 107 may comprise directional indication lighting which may comprise a plurality of lamps arranged to display direction arrows and the like, including whilst flashing. The lamps may be controlled in subsets to change the direction of arrows indicated.

In the embodiment shown in FIG. 1, the vehicle 100 comprises a hoist 135 to raise the further signage 107 above the electronic signage board 106 such that both can be seen from behind the vehicle above the attenuator 109 when the attenuator 109 is in the stowed configuration.

In embodiments, the hoist 135 may be automatically raised when the attenuator 109 is in the stowed configuration when the vehicle 100 is in a signage display mode of operation.

In embodiments, the vehicle 100 comprises visibility lighting 103.

In a preferred embodiment, the vehicle 100 is an electric vehicle comprising a battery supply for an electric drivetrain, thereby being especially suited for fine control low speed driverless mode of operation described hereunder in further detail.

Figure 5:
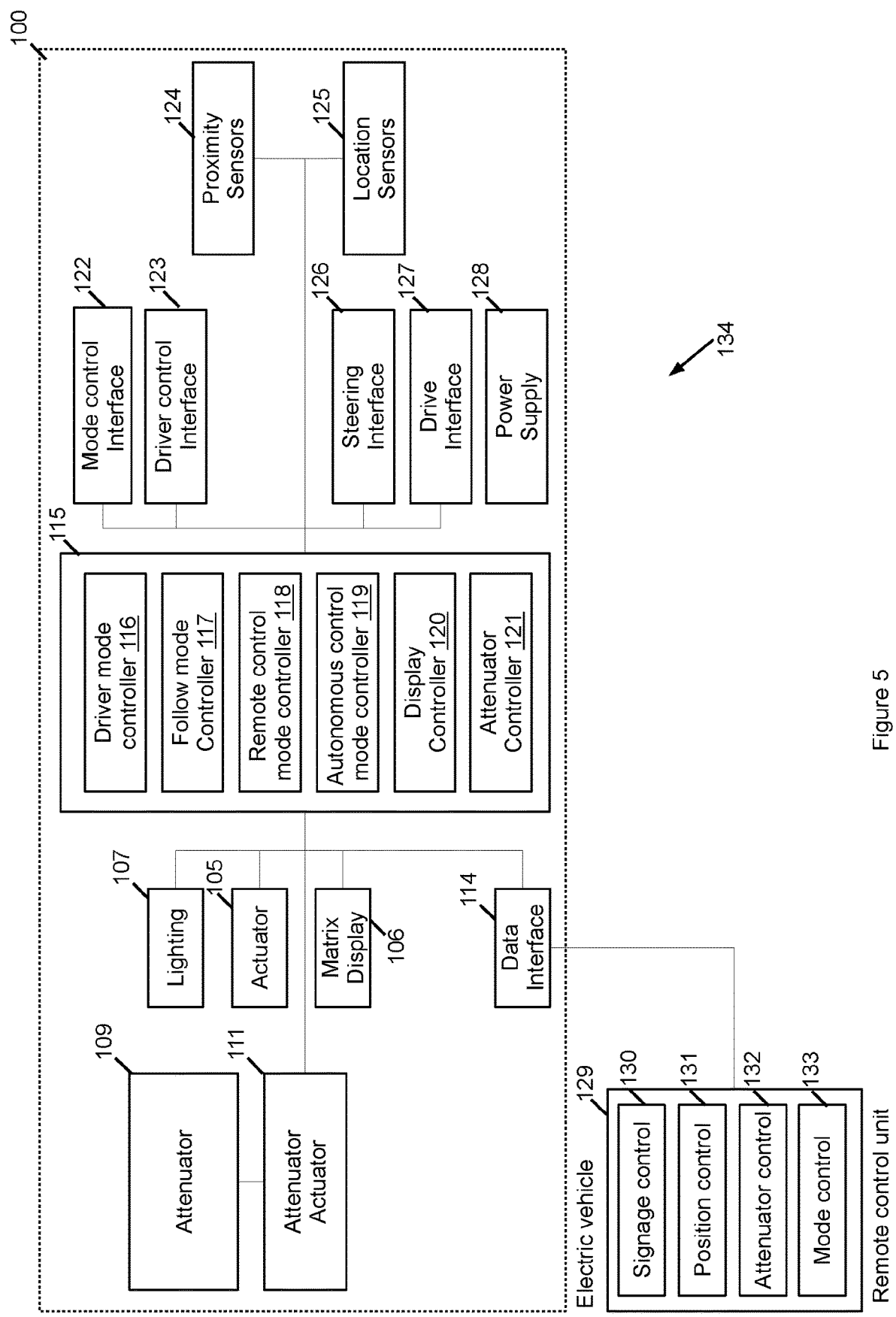
FIG. 5 shows a control system of the vehicle in accordance with an embodiment.

FIG. 5 shows a control system 134 of the vehicle 100 in accordance with an embodiment.

The control system 134 comprises a controller 115 comprising a processor for processing digital data and a memory device operably coupled thereto via a system bus. The memory device is configured for storing digital data including computer program code instructions which are fetched, decoded and executed by the processor in use. These computer program code instructions may be logically divided into various controllers including those shown in FIG. 5, including controllers for driverless modes of operation.

The control system 134 comprises a steering interface 126 for controlling the steering subsystem of the vehicle 100, typically operably controlling the front two wheels of the vehicle 100 so as to be able to turn the vehicle 100 left and right. Furthermore, the control system 134 comprises a drive interface 127 operably controlling the drive subsystem of the vehicle 100 so as to allow the vehicle to drive forwards, including at various speeds, and in reverse.

The control system 134 may comprises an attenuator actuator 111 configured for stowing and deploying the attenuator 109 as illustrated in FIGS. 1 and 2. In this regard, the controllers may comprise an attenuator controller 121 operably controlling the attenuator actuator 111. In embodiments, the control system 134 may comprise a user interface to allow a driver to raise and lower the attenuator 109 from within the cabin 101.

However, in embodiments, the control system 134 may be controlled remotely using a remote-control unit 129 communicating via a data interface 114, such as a short distance radiofrequency interface or alternatively long-distance GSM data interface. In this regard, the remote-control unit 129 may comprise an attenuator controller 132 for raising and lowering the attenuator 109 as shown in FIGS. 1 and 2.

In embodiments, the control system 134 may automatically deploy the attenuator 109 during driverless mode operation.

The control system 134 may comprise an actuator 105 for raising and lowering the hoist 135 for the further signage 107. Furthermore, the control system 134 may draw power from a power supply 128. The power supply 128 may additionally power the electric drivetrain of the vehicle 100.

The controllers may comprise a display controller 124 controlling the signage of the electronic signage board 106 and other electronic signage boards. In embodiments, the memory device of the control system 134 comprises a plurality of roadsigns available for selection by an operator for display on the electronic signage board 106. As such, in use, either using an in-vehicle user interface or via a signage control 130 of the remote-control unit 129, the user may control the display of different roadsigns using the electronic signage board 106.

In embodiments, the control system 134 may automatically control the signage displayed by the electronic signage board 106 including in accordance with the current operation mode of the vehicle 100. For example, the control system 134 may display different roadsigns using the electronic signage board 106 depending on whether the vehicle is driver controlled or operating in a driverless mode of operation.

In embodiments, different signs may be displayed depending on the type of driverless mode. In further embodiments, the control system 134 may display differing signage when the vehicle is reversing. In further embodiments, the control system 134 may infer the speed of the vehicle 100, including by interfacing with a vehicle subsystem thereof or alternatively ascertaining the speed from a GPS location sensor 125 so as to be able to display the travel speed of the vehicle using the electronic signage board 106, or alternatively display different signs depending on the current speed of the vehicle 100. In further embodiments, the control system 134 may display different signs using the electronic signage board 106 depending on an impending manoeuvre of the vehicle 100, such as turning left, turning right, stopping, starting up and the like.

The control system 134 may comprise proximally sensors 124 for sensing the proximity of various objects and obstacles in relation to the vehicle 100. For example, radar or ultrasonic proximally sensors may be deployed around the vehicle so as to, for example, detect obstacles. The control system 134 may be configured for stopping the vehicle when detecting an obstacle in front, for example or alternatively manoeuvring around the obstacle.

The control system 134 may comprise a mode control interface 122 allowing for the configuration of the particular driving mode of operation. In embodiments, the remote-control unit 129 may comprise a mode control 133 for remotely controlling the mode of operation of the vehicle 100.

The control system 134 may comprise a drive control interface 123 for controlling the vehicle 100 from within the cabin 101. In the driver operation mode, the operator may operate the vehicle 100 in the conventional manner, including driving the vehicle 100 to a site.

However, on-site, the user may then configure the vehicle 100 in at least one driverless mode of operation wherein the controller 115 controls the steering 126 and drive interfaces 127 to control the steering and driver of the vehicle 100 respectively. As alluded to above, the controller 115 may control the signs displayed by the electronic signage board 106 accordingly also.

With reference to FIG. 5, the controller 115 comprises a follow mode controller 117 for controlling the drive and steering of the vehicle 100 to follow a lead vehicle. For example, the lead vehicle may comprise a grass cutting unit operating on a road verge. The grass cutting unit may comprise a GPS receiver which ascertains the location of the grass cutting unit and transmits a breadcrumb waypoint file by the data interface 114 to the vehicle 100. The follow mode controller 117 is then configured for controlling the steering interface 126 and the drive interface 127 such that the vehicle 100 follows a configured distance behind the grass cutting unit.

Steering offsets may be provided when, for example, the follow mode controller 117 may be configured to adjust the sideways position of the vehicle so as to travel on the road as opposed to the verge directly behind the grass cutting unit.

An operator may drive vehicle 100 to a position behind a maintenance machine such as a grass cutting unit. The driver may then control the mode control interface 122 within the vehicle 100 to configure the vehicle 100 in the driverless follow mode of operation. The attenuator 109 may be deployed by the operator or alternatively automatically by the controller 115 when entering the driverless follow mode of operation. The operator may then step from the cabin 101 to allow the vehicle 100 to follow the maintenance machine autonomously in the aforedescribed manner. Alternatively, once having stepped from the cabin 101, the operator may switch the vehicle 100 to the driverless follow mode using the mode control 133 of the remote-control unit 129.

The controller 115 comprises a remote-control mode controller 118 configured to control the vehicle 100 in a driverless remote-control mode of operation wherein the steering and drive and other functionality of the vehicle 100 is controlled remotely from the remote-control unit 129.

In this regard, the remote-control unit 129 may comprise a position control 131 for controlling the steering and drive of the vehicle 100. For example, using the position control 131, the operator may control the steering of the vehicle 100 left and right and control the direction and speed of drive of the vehicle from a distance.

The controller 115 comprises an autonomous control mode controller 119 configured for controlling the vehicle 100 in an autonomous driverless mode of operation. In accordance with this mode of operation, a route waypoint file may be generated comprising a plurality of navigational waypoints. The route waypoint file may be generated using a data logging unit travelling along and intended route beforehand.

As such, the autonomous control mode controller 119 may read the route waypoint file from the memory of the controller 115 or receive the waypoint route via the data interface 114 and then control the steering interface 126 and the drive interface 127 to allow the vehicle 100 to follow the set out route by following each waypoint of the route waypoint file in turn.

As alluded to above, the controller 115 may be configured for this plane a plurality of signs on the electronic signage board 106 depending on the driverless mode of operation.

In the driverless autonomous control mode of operation, the controller 115 may be configured for displaying driving indication signs on the electronic signage board 106 or other electronic signage boards of the vehicle. The driving indication signs may comprise turn direction and stopping indication signs.

In embodiments, the controller 115 is configured for displaying the driving indication signs in advance of controlling the steering interface 126 and the drive interface 127 accordingly. In embodiments, the controller is configured for inspecting the route waypoint data file for inferring direction indications therefrom. For example, timestamps of waypoints within the route waypoint data file may be analysed to detect slowing down or stopping such that stopping indication signs may be appropriately displayed in advance. Furthermore, lateral offsets of waypoints indicative of changing of directional lanes may be analysed by the controller 115 to display turn direction indication signs appropriately in advance.

In the driverless follow mode of operation, the control system 134 may be configured for displaying driving indication signs comprising turn direction and stopping indication signs of the lead vehicle. In accordance with this embodiment, the controller 115 may be configured for receiving driving indication data signals from the lead vehicle by the data interface 114 and displaying the driving indication signs according to the driving indication data signals.

Furthermore, in the driverless follow mode of operation, the control system 134 may be configured for detecting respective positions of the driverless traffic management vehicle 100 and the lead vehicle and determining a distance therebetween and displaying the distance using the electronic signage board 106 other electronic signage boards of the vehicle 100. The control system 134 may be calculated for detecting a distance between the traffic management vehicle 100 and the lead vehicle along an active route to account for road bends.

The signage control interface 130 of the remote-control unit 129 may be used to select which signage to be displayed by the electronic signage board 106 or other electronic signage boards of the vehicle 100. In embodiments, the signage control interface 130 may display an image gallery of available signs for selection. Alternatively, the signage control interface 130 may allow the user to specify the mode of operation, such as grass cutting driverless follow mode of operation wherein the controller 115 select the appropriate signage to display indicative of the vehicle 100 following behind a grass cutter.

In embodiments, the predefined waypoint route comprises waypoint regions of the attenuator 109 is to be deployed in waypoint regions where the attenuator is to be stowed. As such, when in the driverless autonomous control mode of operation, the controller 115 may be configured for controlling the actuator 111 to deploy or stow the attenuator accordingly. In accordance with this embodiment, the controller 115 may automatically deploy the attenuator 109 when the predefined waypoint route causes the vehicle 100 to come to a stop. Conversely, when the predefined waypoint route causes the vehicle 100 to commence travelling, the controller 115 may automatically stow the attenuator 109.

In embodiments, the controller 115 is configured for sensing the speed of the traffic management vehicle 100, such as by using the location sensors 125 or vehicle management interface to sense the speed of the vehicle 100 and automatically deploy the impact attenuator 109 when the speed is less than a set speed deployment threshold, such as less than 10 km an hour or when the vehicle 100 is stationary stopped for periods of time.

In embodiments, in the at least one driverless mode of operation, the controller 115 may be configured for sensing a verge offset of the traffic management vehicle 100 with respect to a road verge and automatically deploying or stowing the attenuator 109 accordingly. The controller 115 may use the location sensors 125 to determine a lateral offset of the traffic management vehicle 100. In alternative embodiments, the control system 104 may comprise a vision subsystem (not shown) from which surrounding image data is obtained and analysed by the controller 115 to infer a lateral offset from a road verge or centreline marking to determine the lateral offset of the vehicle 100. In this way, for example, the attenuator 109 may be automatically deployed when the vehicle is across the road verge or in the centre of a particular lane.

In embodiments, the motor control interface 122 allows the setting of a following distance such that, when the vehicle 100 operates in the driverless follow mode of operation, the following mode controller 117 is configured for controlling the drive interface 127 to follow the lead vehicle at the configured following distance.

The foregoing description, for purposes of explanation, used specific nomenclature to provide a thorough understanding of the invention. However, it will be apparent to one skilled in the art that specific details are not required in order to practise the invention. Thus, the foregoing descriptions of specific embodiments of the invention are presented for purposes of illustration and description. They are not intended to be exhaustive or to limit the invention to the precise forms disclosed as obviously many modifications and variations are possible in view of the above teachings. The embodiments were chosen and described in order to best explain the principles of the invention and its practical applications, thereby enabling others skilled in the art to best utilize the invention and various embodiments with various modifications as are suited to the particular use contemplated. It is intended that the following claims and their equivalents define the scope of the invention.

The invention claimed is:

1. A driverless traffic management vehicle comprising a control system having a controller interfacing steering and drive interfaces for control of respective steering and drive subsystems of the vehicle, an impact attenuator and attenuator actuator therefor for configuring the attenuator in deployed and stowed configurations and wherein the control system comprises at least one driverless mode controller operably controlling the steering and drive interfaces for controlling the vehicle in at least one driverless mode of operation, the control system comprises a mode control interface configured for setting the at least one driverless mode of operation and the at least one driverless mode controller comprises:

a follow mode controller configured for controlling the vehicle in a driverless follow mode of operation and wherein the vehicle comprises a data interface and wherein, in use, the data interface is configured for receiving waypoint data from a lead vehicle and wherein the follow mode controller is configured for controlling the steering and drive interfaces to control the vehicle to follow the lead vehicle using the waypoint data;

a remote-control mode controller configured for controlling the vehicle in a driverless remote-control mode of operation wherein the remote-control mode controller receives control instructions from a remote-control unit, the remote-controller comprising controls for controlling at least one of the steering and drive of the vehicle, and controlling at least one of the steering and drive interfaces accordingly; and driverless autonomous control mode controller configured for controlling the vehicle in a driverless autonomous control mode of operation wherein, in use, the driverless autonomous control mode controller is configured for controlling the steering and drive interfaces such that the vehicle follows a predefined waypoint route defined by a route waypoint data file.

2. The driverless traffic management vehicle as claimed in claim 1, wherein the traffic management vehicle further comprises an electronic signage board and wherein the controller is configured for displaying a plurality of signs thereof depending on the at least one driverless mode of operation.

3. The driverless traffic management vehicle as claimed in claim 2, wherein, in the driverless autonomous control mode of operation, the controller is configured for displaying driving indication signs comprising turn direction and stopping indication signs in advance of the controller controlling the steering and drive interfaces respectively.

4. The driverless traffic management vehicle as claimed in claim 3, wherein the controller is configured for analysing the route waypoint data file for inferring direction and stopping indications therefrom.

5. The driverless traffic management vehicle as claimed in claim 4, wherein the controller analyses waypoint timestamps within the route waypoint data file to detect at least one slowing down or stopping location along the predefined waypoint route and displays a stopping indication sign using the electronic signage board in advance of the at least one slowing down or stopping location.

6. The driverless traffic management vehicle as claimed in claim 4, wherein the controller analyses lateral offset positions of waypoints within the route waypoint data to detect at least one change of direction location along the predefined waypoint route and displays a turn direction sign using the electronic signage board in advance of the at least one change of direction location.

7. The driverless traffic management vehicle as claimed in claim 2, wherein, in the driverless follow mode of operation, the controller is configured for displaying driving indication signs comprising turn direction and stopping indication signs and wherein the controller is configured for receiving driving indication data signals from the lead vehicle and displaying the driving indication signs according to the driving indication data signals.

8. The driverless traffic management vehicle as claimed in claim 2, wherein, in the driverless follow mode of operation, the control system is configured for detecting respective positions of the driverless traffic management vehicle and the lead vehicle and determining a distance along a route therebetween and displaying the distance using the electronic signage board.

9. The driverless traffic management vehicle as claimed in claim 2, wherein the remote-control unit comprises a signage control configured for selecting one of the plurality of signs remotely for display on the electronic signage board.

10. The driverless traffic management vehicle as claimed in claim 2, wherein the attenuator is pivotally coupled to a rear of the vehicle so as to pivot upwardly to the stowed configuration and pivot downwardly to the deployed configuration and wherein, in the stowed configuration, the electronic signage board is revealed behind the attenuator.

11. The driverless traffic management vehicle as claimed in claim 10, wherein the attenuator comprises a rear surface and wherein the traffic management vehicle further comprises an attenuator electronic signage board on the rear surface and, wherein, in the stowed configuration, the controller is configured for displaying a plurality of signs on the attenuator electronic signage board and in the deployed configuration, the controller is configured for displaying a plurality of signs on the electronic signage board.

12. The driverless traffic management vehicle as claimed in claim 10, wherein the traffic management vehicle further comprises a hoist having signage thereon which can be raised when the attenuator is in the stowed configuration such that the signage thereon is viewable above the attenuator.

13. The driverless traffic management vehicle as claimed in claim 11, further comprising a further electronic signage board across a rearward impact face of the attenuator and wherein the controller is configured for displaying signs thereon when the attenuator is in the deployed configuration.

14. The driverless traffic management vehicle as claimed in claim 1, wherein the remote-controller comprises a control for stowing or deploying the attenuator and wherein the controller is configured for controlling the attenuator actuator according to control signals received from the remote-controller.

15. The driverless traffic management vehicle as claimed in claim 1, wherein the remote-control unit comprises a mode control configured for setting the at least one driverless mode of operation remotely.

16. The driverless traffic management vehicle as claimed in claim 1, wherein the predefined waypoint route comprises waypoint regions where the attenuator is to be deployed and waypoint regions where the attenuator is to be stowed and wherein, when in the driverless autonomous control mode of operation, the controller is configured for controlling the attenuator actuator to deploy or stow the attenuator accordingly.

17. The driverless traffic management vehicle as claimed in claim 1, wherein, in the at least one driverless mode of operation, the controller is configured for sensing the speed of the traffic management vehicle and automatically deploying the impact attenuator when the speed is less than a set speed deployment threshold.

18. The driverless traffic management vehicle as claimed in claim 1, wherein, in the at least one driverless mode of operation, the controller is configured for sensing a verge offset of the traffic management vehicle with respect to a road verge and automatically deploying the impact attenuator according to the verge offset.

19. The driverless traffic management vehicle as claimed in claim 1, further comprising at least one proximity sensor and, in the at least one driverless mode of operation, the controller is configured for detecting an obstacle using the proximity sensor and controlling at least one of the steering and drive interfaces to avoid a collision therewith.

20. The driverless traffic management vehicle as claimed in claim 1, wherein the mode control interface allows setting of a following distance and, in the driverless follow mode of operation, the follow mode controller is configured for following the lead vehicle at the following distance.

21. The driverless traffic management vehicle as claimed in claim 1, wherein the mode control interface allows for configuration of a lateral steering offset and wherein the, in the driverless autonomous control mode of operation, the follow mode controller is configured to adjust a lateral position of the vehicle according to the lateral steering offset.

22. The driverless traffic management vehicle as claimed in claim 1, wherein the vehicle comprises an electric drivetrain.

23. A method of traffic management using a vehicle as claimed in claim 1, the method comprising driving the vehicle to a roadside location and then setting the vehicle in a driverless mode of operation and leaving the vehicle to drive autonomously.

* * * * *